US012565054B2

(12) United States Patent
Tanaka

(10) Patent No.: US 12,565,054 B2
(45) Date of Patent: Mar. 3, 2026

(54) DRIVING MECHANISM, MOVING DEVICE, AND RECORDING DEVICE

(71) Applicant: SEIKO EPSON CORPORATION, Tokyo (JP)

(72) Inventor: Takuto Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 18/362,009

(22) Filed: Jul. 31, 2023

(65) Prior Publication Data

US 2024/0042782 A1 Feb. 8, 2024

(30) Foreign Application Priority Data

Aug. 2, 2022 (JP) .................................. 2022-123125

(51) Int. Cl.
| | |
|---|---|
| *F16H 55/22* | (2006.01) |
| *B41J 2/165* | (2006.01) |
| *B41J 25/304* | (2006.01) |
| *B41J 29/393* | (2006.01) |
| *F16H 57/021* | (2012.01) |

(52) U.S. Cl.
CPC ............. *B41J 29/393* (2013.01); *B41J 2/165* (2013.01); *B41J 25/304* (2013.01); *F16H 55/22* (2013.01); *F16H 57/021* (2013.01); *B41J 2002/16582* (2013.01); *F16H 2057/0213* (2013.01)

(58) Field of Classification Search
CPC ...... B41J 29/393; F16H 55/22; F16H 57/021; F16H 2057/0213
See application file for complete search history.

(56) References Cited

U.S. PATENT DOCUMENTS

| | | | | |
|---|---|---|---|---|
| 4,787,761 A | * | 11/1988 | Tezuka ..................... | B41J 29/58 |
| | | | | 400/187 |
| 5,993,095 A | * | 11/1999 | Harris ...................... | B41J 33/14 |
| | | | | 400/625 |
| 2021/0237447 A1 | | 8/2021 | Shimomura et al. | |

FOREIGN PATENT DOCUMENTS

| | | |
|---|---|---|
| CN | 1198987 | 11/1998 |
| JP | 2009-145551 A | 7/2009 |
| JP | 2012-63617 A | 3/2012 |
| JP | 2021-121478 A | 8/2021 |

* cited by examiner

*Primary Examiner* — Sharon Polk
(74) *Attorney, Agent, or Firm* — WORKMAN NYDEGGER

(57) ABSTRACT

A driving mechanism moves a moving unit in a predetermined direction and an opposite direction that is opposite to the predetermined direction. The driving mechanism includes a worm that is coupled to a driving source and rotates to move the moving unit, a worm wheel that is meshed with the worm, and a holding portion that holds the worm. The holding portion includes a highly-regulating portion that contacts with the worm when the moving unit moves in the predetermined direction, and a weakly-regulating portion that contacts with the worm when the moving unit moves in the opposite direction. A friction coefficient between the highly-regulating portion and the worm is greater than a friction coefficient between the weak regulation portion and the worm.

13 Claims, 10 Drawing Sheets

DRIVING MECHANISM, MOVING DEVICE, AND RECORDING DEVICE

The present application is based on, and claims priority from JP Application Serial Number 2022-123125, filed Aug. 2, 2022, the disclosure of which is hereby incorporated by reference herein in its entirety.

BACKGROUND

1. Technical Field

The present disclosure relates to a driving mechanism, a moving device, and a recording device.

2. Related Art

JP-A-2009-145551 describes a driving mechanism including a worm that is rotated by a driving source, a worm wheel that is meshed with the worm, and a holding portion that holds the worm. The driving mechanism rotates the worm to move a moving unit.

In such a driving mechanism, when the moving unit is moved, the worm receives a thrust force from the worm wheel. With this, the worm abuts against the holding portion. The worm abuts against the holding portion, and then a rotation load is applied to the worm. In some cases, the rotation load may differ for each of two directions in which the moving unit is moved. For example, when the moving unit is moved downward, the rotation load of the worm may be large in some cases in order to avoid an excessively high speed of the moving unit. For example, when the moving unit is moved upward, the rotation load of the worm may be small in some cases in order to move the moving unit smoothly.

SUMMARY

In order to solve the above-mentioned problem, a driving mechanism is configured to move a moving unit in a predetermined direction and an opposite direction that is opposite to the predetermined direction, the driving mechanism including a worm configured to be coupled to a driving source and to rotate to move the moving unit, a worm wheel configured to mesh with the worm, and a holding portion configured to hold the worm, wherein the holding portion includes a highly-regulating portion configured to come into contact with the worm when the moving unit moves in the predetermined direction, and a weakly-regulating portion configured to come into contact with the worm when the moving unit moves in the opposite direction, and a friction coefficient between the highly-regulating portion and the worm is greater than a friction coefficient between the weakly-regulating portion and the worm.

In order to solve the above-mentioned problem, a moving device includes the above-mentioned driving mechanism, the moving unit, and a control unit configured to control the driving mechanism, wherein, in a case in which the moving unit is moved in the predetermined direction, at a timing at which a rotation load of the worm exceeds the threshold value, the control unit stops the driving source to stop the moving unit.

In order to solve the above-mentioned problem, a moving device includes the above-mentioned driving mechanism, the moving unit, and a control unit configured to control the driving mechanism, wherein, in a case in which the moving unit is moved in the opposite direction, at a timing at which a moving amount of the moving unit exceeds the threshold value, the control unit stops the driving source to stop the moving unit.

In order to solve the above-mentioned problem, a recording device includes the above-mentioned driving mechanism and the moving unit, wherein the moving unit is a recording unit configured to perform recording on a medium.

In order to solve the above-mentioned problem, a recording device includes the above-mentioned driving mechanism, a recording unit configured to eject a liquid onto a medium to perform recording, and the moving unit, wherein the moving unit is a maintenance unit configured to perform maintenance for the recording unit.

In order to solve the above-mentioned problem, a recording device includes a recording unit configured to eject a liquid onto a medium to perform recording, a maintenance unit configured to perform maintenance for the recording unit, a first driving mechanism configured to move the recording unit in a first predetermined direction and a first opposite direction that is opposite to the first predetermined direction, and a second driving mechanism configured to move the maintenance unit in a second predetermined direction and a second opposite direction that is opposite to the second predetermined direction, wherein the second predetermined direction is a direction that is different from the first predetermined direction and the first opposite direction, the first driving mechanism includes a first worm configured to be coupled to a first driving source and to rotate to move the recording unit, a first worm wheel configured to mesh with the first worm, and a first holding portion configured to hold the first worm, the first holding portion includes a first highly-regulating portion configured to come into contact with the first worm when the recording unit moves in the first predetermined direction, and a first weakly-regulating portion configured to come into contact with the first worm when the recording unit moves in the first opposite direction, the second driving mechanism includes a second worm configured to be coupled to a second driving source and to rotate to move the maintenance unit, a second worm wheel configured to mesh with the second worm, and a second holding portion configured to hold the second worm, the second holding portion includes a second highly-regulating portion configured to come into contact with the second worm when the maintenance unit moves in the second predetermined direction, and a second weakly-regulating portion configured to come into contact with the second worm when the maintenance unit moves in the second opposite direction, a friction coefficient between the first highly-regulating portion and the first worm is greater than a friction coefficient between the first weakly-regulating portion and the first worm, and a friction coefficient between the second highly-regulating portion and the second worm is greater than a friction coefficient between the second weakly-regulating portion and the second worm.

DESCRIPTION OF EMBODIMENTS

As an example of a moving device including a driving mechanism, a recording device is described below with reference to the drawings. The moving device is not limited to the recording device, and may be implemented as other devices. The recording device is a printer that records an image such as a character and a picture on a medium such as a paper sheet and fabric. In particular, the recording device is an ink-jet printer that ejects ink, which is an example of a liquid, onto a medium to record an image.

Recording Device

Figure 1:
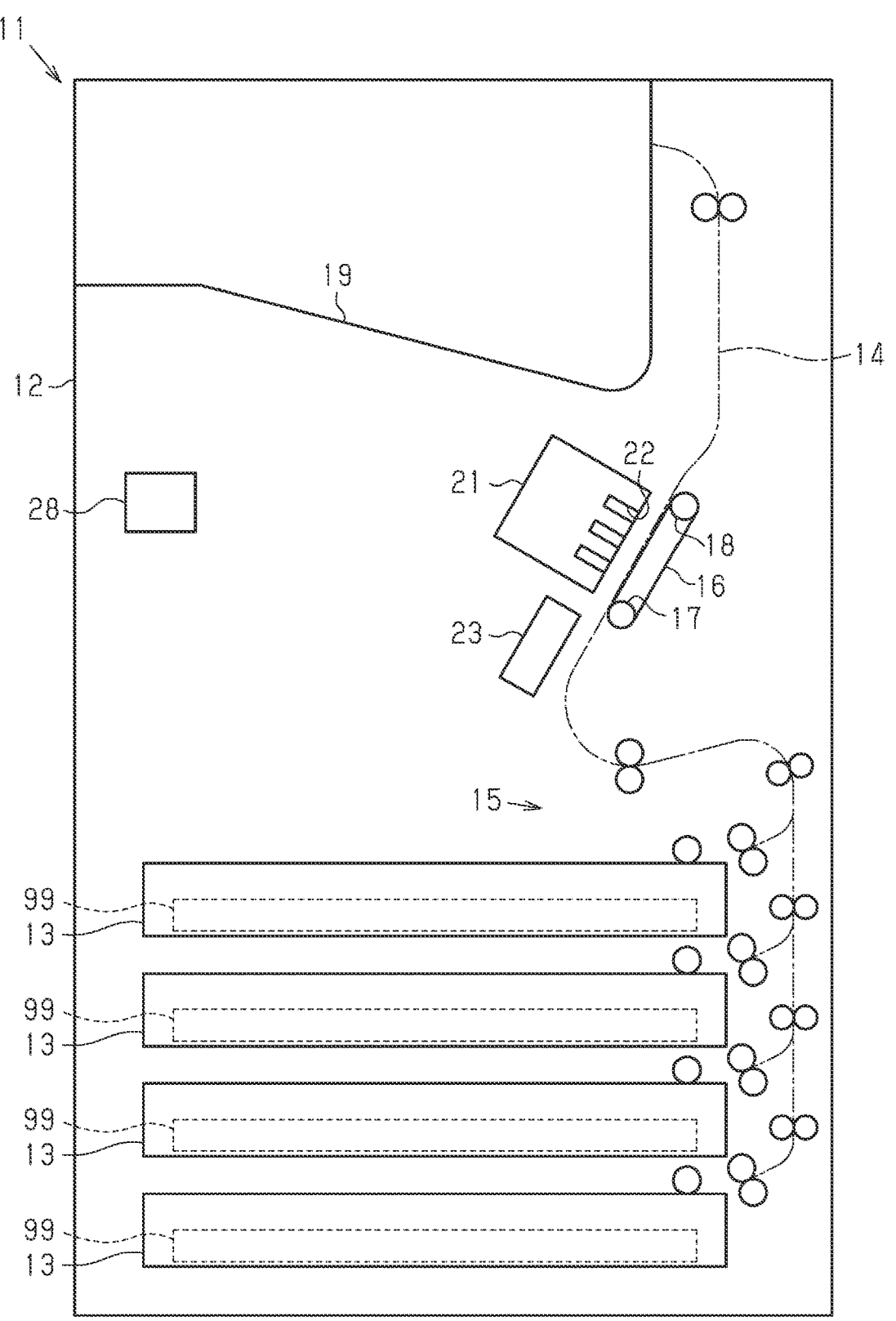
FIG. 1 is a front view illustrating a recording device being an example of a moving device.

As illustrated in FIG. 1, a recording device 11 includes a housing 12.

The recording device 11 includes one or more accommodation units 13. The accommodation unit 13 is configured to accommodate a medium 99. For example, the accommodation unit 13 is a cassette that can be drawn from the housing 12.

The recording device 11 includes a transport path 14. The transport path 14 is a path in which the medium 99 is transported. The transport path 14 extends inside the housing 12. For example, the transport path 14 extends so that the medium 99 is discharged from the accommodation unit 13 to the outside of the housing 12. While the medium 99 is transported in the transport path 14, an image is recorded thereon.

The recording device 11 includes a transport unit 15. The transport unit 15 is configured to transport the medium 99. For example, the transport unit 15 includes one or more rollers. The transport unit 15 transports the medium 99 accommodated in the accommodation unit 13, along the transport path 14.

For example, the transport unit 15 includes a transport belt 16, a first pulley 17, and a second pulley 18. The transport belt 16 is wound around the first pulley 17 and the second pulley 18. For example, the transport belt 16 attracts the medium 99 by electrostatic attraction. With this, the transport belt 16 supports the medium 99. For example, the transport belt 16 may be configured attract the medium 99 through suction by a negative pressure. The first pulley 17 and the second pulley 18 are positioned along the transport path 14. The first pulley 17 and the second pulley 18 rotate to circulate the transport belt 16. As a result, the medium 99 supported on the transport belt 16 is transported.

The recording device 11 includes a stacker 19. On the stacker 19, the medium 99 after recording is stacked. For example, the stacker 19 is positioned outside of the housing 12. The medium 99 is transported in the transport path 14, and then is discharged to the stacker 19.

The recording device 11 includes a recording unit 21. The recording unit 21 is configured to record an image on the medium 99. The recording unit 21 ejects a liquid onto the medium 99 to record an image on the medium 99. For example, the recording unit 21 is a head including one or more nozzles 22. The recording unit 21 records an image on the medium 99 transported by the transport unit 15. For example, the recording unit 21 is provided at a position facing the transport belt 16. The recording unit 21 records an image on the medium 99 supported on the transport belt 16.

Figure 2:
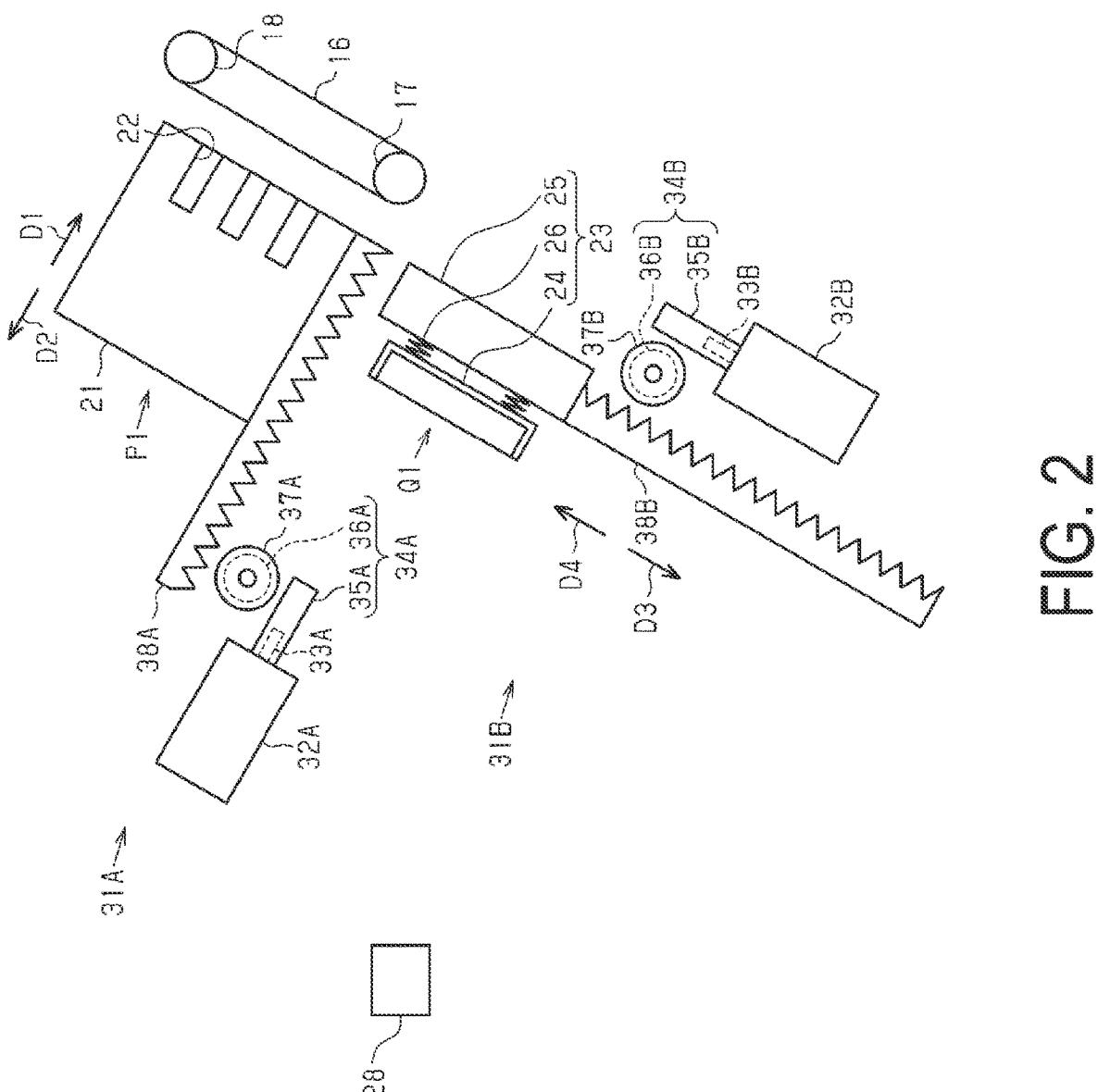
FIG. 2 is a front view of a recording unit at a recording position and a maintenance unit at a stand-by position.
Figure 3:
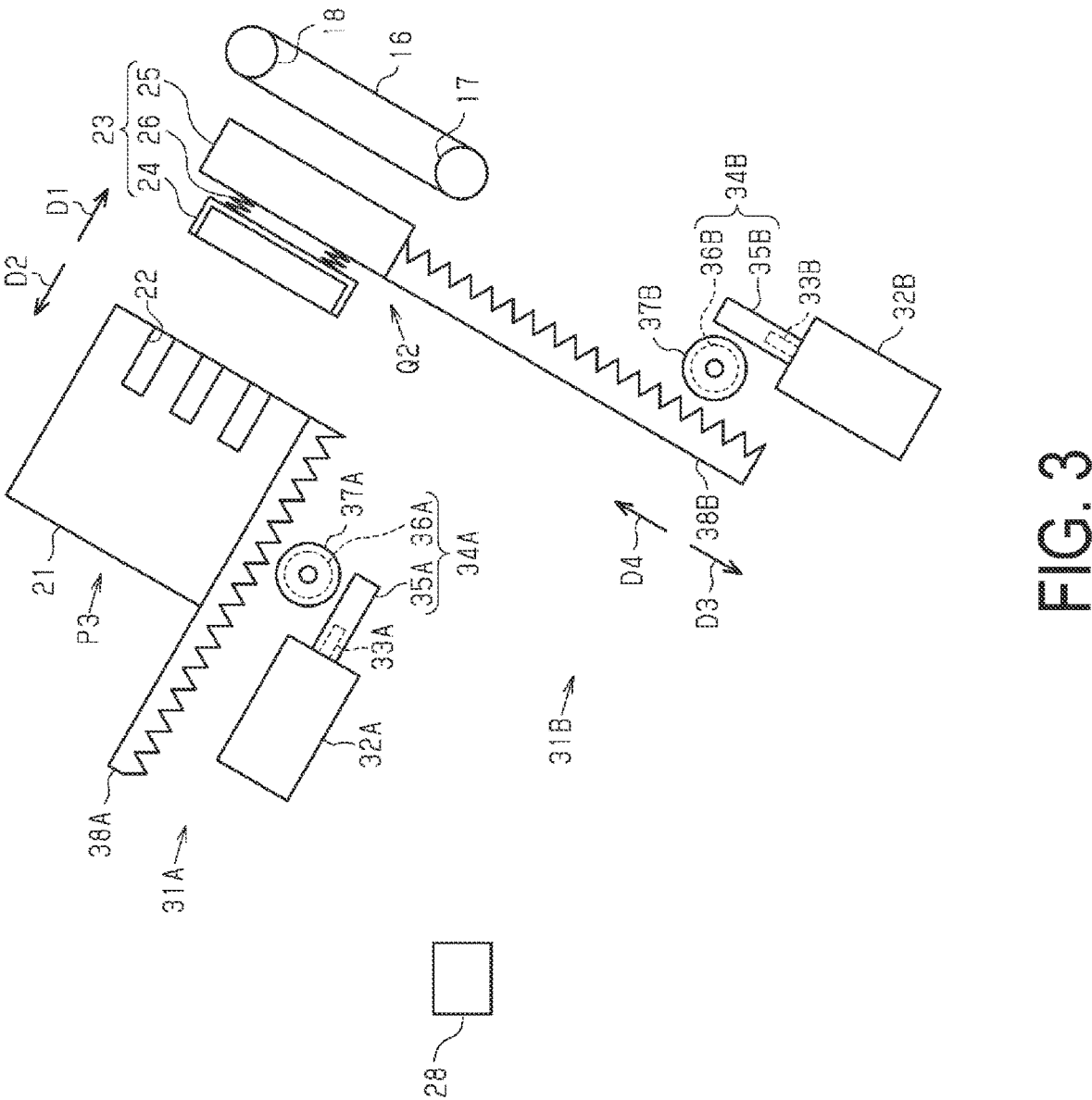
FIG. 3 is a front view of the recording unit at a retraction position and the maintenance unit at a contact position.
Figure 4:
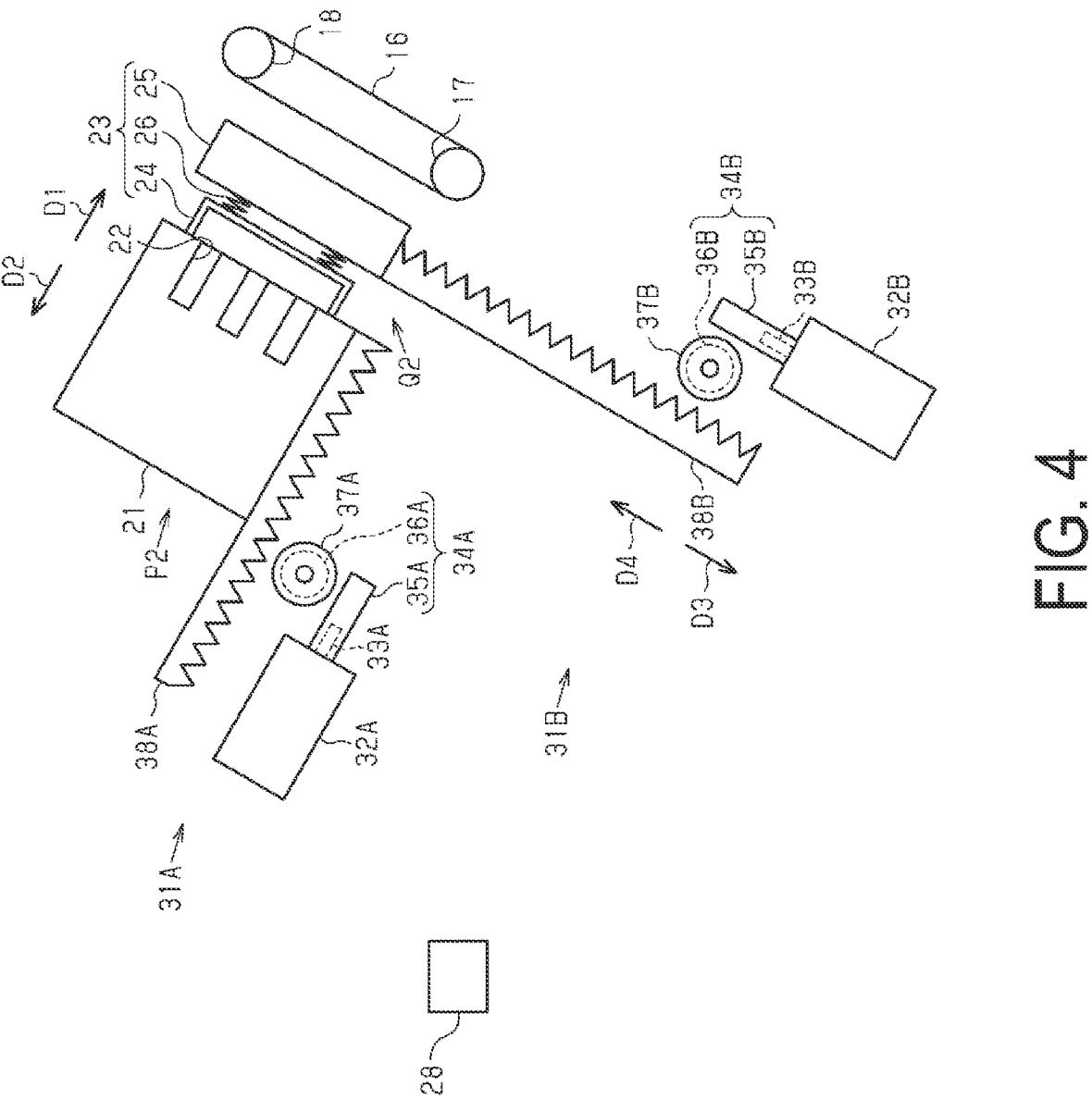
FIG. 4 is a front view of the recording unit at a maintenance position and the maintenance unit at the contact position.

As illustrated in FIG. 2, FIG. 3, and FIG. 4, the recording unit 21 is configured to move to a plurality of positions. The recording unit 21 is configured to move to a recording position P1 and a maintenance position P2. The position of the recording unit 21 illustrated in FIG. 2 is the recording position P1. The position of the recording unit 21 illustrated in FIG. 4 is the maintenance position P2. The recording unit 21 is configured to move to a retraction position P3, in addition to the recording position P1 and the maintenance position P2. The position of the recording unit 21 illustrated in FIG. 3 is the retraction position P3.

The recording position P1 is a position at which the recording unit 21 performs recording on the medium 99. Among the recording position P1, the maintenance position P2, and the retraction position P3, the recording position P1 is a position at which the recording unit 21 is closest to the transport belt 16. For example, the recording position P1 is a position downward of the maintenance position P2.

The maintenance position P2 is a position at which maintenance is performed for the recording unit 21. For example, the maintenance position P2 is a position downward of the retraction position P3.

The retraction position P3 is a position to which the recording unit 21 is retracted. The retraction position P3 is a position through which the recording unit 21 passes when the recording unit 21 is displaced from the recording position P1 and the maintenance position P2, and the recording unit 21 is displaced from the maintenance position P2 to the recording position P1. Thus, when the recording unit 21 is displaced between the recording position P1 and the maintenance position P2, the recording unit 21 is temporarily retracted to the retraction position P3.

The recording device 11 includes a maintenance unit 23. The maintenance unit 23 is configured to perform maintenance for the recording unit 21. The maintenance unit 23 contacts with the recording unit 21 to perform maintenance for the recording unit 21. For example, the maintenance unit 23 includes a contact portion 24, a support portion 25, and a press portion 26.

When the maintenance unit 23 performs maintenance for the recording unit 21, the contact portion 24 contacts with the recording unit 21. Specifically in detail, the contact portion 24 contacts with the recording unit 21 so as to cover the nozzle 22. For example, the contact portion 24 is a cap that covers the nozzle 22. Therefore, the contact portion 24 contacts with the recording unit 21 to keep the nozzle 22 moisturized. As a result, clogging at the nozzle 22 is suppressed. This is so-called capping. In this manner, the maintenance unit 23 performs maintenance for the recording unit 21. The contact portion 24 is not limited to the cap, and may be a wiper that contacts with the recording unit 21 to wipe off a liquid. In this case, a liquid adhering to the recording unit 21 is removed. This is so-called wiping.

For example, the maintenance unit 23 may apply a negative pressure to the recording unit 21 in a state in which the contact portion 24 contacts with the recording unit 21 to forcefully discharge a liquid from the nozzle 22. In this case, a solidified liquid, bubbles, and the like are discharged from the recording unit 21. This is so-called cleaning. The maintenance unit 23 performs maintenance such as capping, wiping, and cleaning on the recording unit 21.

The contact portion 24 receives a liquid applied through flushing. With this, the maintenance unit 23 may perform maintenance for the recording unit 21. Flushing indicates ejection of a liquid by the recording unit 21 for the purpose of suppressing clogging at the nozzle 22. The recording unit 21 may perform flushing in a state in which the contact portion 24 contacts with the recording unit 21 or in a non-contact state. In other words, the maintenance unit 23 can perform maintenance in a state in which the contact portion 24 does not come into contact with the recording unit 21. However, in the present exemplary embodiment, description is made assuming that the maintenance unit 23 contacts with the recording unit 21 to perform maintenance for the recording unit 21.

The support portion 25 supports the contact portion 24.

The press portion 26 is attached to the contact portion 24 and the support portion 25. When the contact portion 24 contacts with the recording unit 21, the press portion 26 presses the contact portion 24 against the recording unit 21. With this, the contact portion 24 closely contacts with the recording unit 21. An effect of maintenance performed by the maintenance unit 23 is improved by close contact of the contact portion 24 with the recording unit 21. For example, the press portion 26 is a spring.

The maintenance unit 23 is configured to move to a plurality of positions. The maintenance unit 23 is configured to move to a stand-by position Q1 and a contact position Q2. The position of the maintenance unit 23 illustrated in FIG. 2 is the stand-by position Q1. The position of the maintenance unit 23 illustrated in FIG. 3 and FIG. 4 is the contact position Q2.

The stand-by position Q1 is a position at which the maintenance unit 23 stands by. When maintenance is not performed for the recording unit 21, for example, the recording unit 21 performs recording, the maintenance unit 23 is at the stand-by position Q1. For example, the stand-by position Q1 is a position downward of the contact position Q2.

The contact position Q2 is a position at which the maintenance unit 23 contacts with the recording unit 21. In other words, the contact position Q2 is a position at which the maintenance unit 23 performs maintenance for the recording unit 21. The maintenance unit 23 at the contact position Q2 contacts with the recording unit 21 at the maintenance position P2. The contact position Q2 is a position between the recording unit 21 and the transport belt 16.

First, when the maintenance unit 23 performs maintenance for the recording unit 21, the recording unit 21 is displaced from the recording position P1 to the retraction position P3. While the recording unit 21 is displaced from the recording position P1 to the retraction position P3, the maintenance unit 23 is displaced from the stand-by position Q1 to the contact position Q2. After the maintenance unit 23 is displaced to the contact position Q2, the recording unit 21 is displaced from the retraction position P3 to the maintenance position P2. With this, the recording unit 21 contacts with the maintenance unit 23. When the recording unit 21 does not record an image on the medium 99, a stand-by state continues while the recording unit 21 and the maintenance unit 23 come into contact with each other.

First, while the recording unit 21 records an image on the medium 99, the recording unit 21 is replaced from the maintenance position P2 to the retraction position P3. While the recording unit 21 is displaced from the maintenance position P2 to the retraction position P3, the maintenance unit 23 is displaced from the contact position Q2 to the stand-by position Q1. After the maintenance unit 23 is displaced to the stand-by position Q1, the recording unit 21 is displaced from the retraction position P3 to the recording position P1.

The recording device 11 includes a control unit 28. The control unit 28 controls movement of the recording unit 21. The control unit 28 controls movement of the maintenance unit 23. The control unit 28 may integrally control the recording device 11.

The control unit 28 may be configured by one or more processors that execute various types of processing in accordance with a computer program. The control unit 28 may be configured by one or more dedicated hardware circuits such as an application-specific integrated circuit that executes at least a part of various kinds of processing. The control unit 28 may be configured by a circuit including a processor and a hardware circuit. The processor includes a CPU and memory such as RAM and ROM. The memory stores program codes or commands configured to execute processing on the CPU. The memory, that is, a computer-readable medium, includes any readable medium that can be accessed by a general purpose or special purpose computer.

The recording device 11 includes one or more driving mechanisms. The driving mechanism is a mechanism that moves a moving unit being a moving target. The driving mechanism is controlled by the control unit 28. Therefore, movement of the moving unit is controlled by the control unit 28. The moving device includes at least the moving unit, the driving mechanism, and the control unit 28.

For example, the recording device 11 includes a first driving mechanism 31A and a second driving mechanism 31B. The first driving mechanism 31A is a mechanism that moves the recording unit 21. In other words, in a case of the first driving mechanism 31A, the moving unit is the recording unit 21. The second driving mechanism 31B is a mechanism that moves the maintenance unit 23. In other words, in a case of the second driving mechanism 31B, the moving unit is the maintenance unit 23. The first driving mechanism 31A and the second driving mechanism 31B move the respective moving units in the directions that are different from each other.

First Driving Mechanism

First, the first driving mechanism 31A is described.

The first driving mechanism 31A includes a first driving source 32A. The first driving source 32A is a motor. The first driving source 32A includes a first output shaft 33A. The first output shaft 33A is a so-called rotor. The first driving source 32A rotates the first output shaft 33A.

The first driving mechanism 31A may include a control circuit. The control circuit is a circuit that controls the first driving source 32A. For example, the control circuit controls the first driving source 32A, based on an instruction from the control unit 28.

The first driving mechanism 31A includes a first worm gear 34A. The first worm gear 34A is coupled to the first driving source 32A. The first worm gear 34A includes a first worm 35A and a first worm wheel 36A. The first worm 35A is coupled to the first output shaft 33A. Specifically, the first worm 35A is coupled to the first output shaft 33A via a coupling member. The first worm 35A may be coupled to the first output shaft 33A by directly attaching the first worm 35A to the first output shaft 33A. The first worm 35A rotates together with the first output shaft 33A. The first worm 35A rotates to move, the moving unit, in other words, the recording unit 21. The first worm wheel 36A is meshed with the first worm 35A. The first worm wheel 36A rotates together with the first worm 35A.

The first driving mechanism 31A includes a first driving toothed gear 37A. The first driving toothed gear 37A is coupled to the first worm wheel 36A. For example, the first driving toothed gear 37A is positioned coaxially with the first worm wheel 36A, and then is coupled to the first worm wheel 36A. The first driving toothed gear 37A rotates together with the first worm wheel 36A. The first driving toothed gear 37A is not limited to be coaxial with the first worm wheel 36A, and may be positioned on an axis different from the first worm wheel 36A. For example, the first driving toothed gear 37A may be coupled to the first worm wheel 36A via a gear train including a plurality of toothed gears.

The first driving mechanism 31A includes a first rack 38A. The first rack 38A is meshed with the first driving toothed gear 37A. The first rack 38A linearly extends in one direction. For example, the first rack 38A extends in a first predetermined direction D1. The first rack 38A and the first driving toothed gear 37A form a rack-and-pinion configuration. The first driving toothed gear 37A rotates to move the first rack 38A relatively to the first driving toothed gear 37A.

For example, the first rack 38A is attached to the recording unit 21. Meanwhile, the first driving source 32A, the first worm gear 34A, and the first driving toothed gear 37A are attached to the housing 12. In this case, the first driving toothed gear 37A rotates to move the first rack 38A with respect to the first driving toothed gear 37A. As the first rack 38A moves, the recording unit 21 moves.

For example, the first rack 38A may be fixed to the housing 12. Meanwhile, the first driving source 32A, the first worm gear 34A, and the first driving toothed gear 37A may be attached to the recording unit 21. In this case, the first driving toothed gear 37A rotates to move the first driving source 32A, the first worm gear 34A, and the first driving toothed gear 37A with respect to the first rack 38A. As the first driving source 32A, the first worm gear 34A, and the first driving toothed gear 37A move, the recording unit 21 moves.

The first driving mechanism 31A moves the recording unit 21 in the direction in which the first rack 38A extends. The first driving mechanism 31A moves the recording unit 21 in the first predetermined direction D1 and a first opposite direction D2 that is opposite to the first predetermined direction D1. The first driving mechanism 31A moves the recording unit 21 in the first predetermined direction D1 and the first opposite direction D2 to move the recording unit 21 to the recording position P1, the maintenance position P2, and the retraction position P3.

For example, the first predetermined direction D1 is a direction extending downward. Thus, when the recording unit 21 moves in the first predetermined direction D1, the recording unit 21 moves downward. However, "the direction extending downward" is not limited to the vertically downward direction. For example, the first predetermined direction D1 is a direction that is different from both of a vertical direction and a horizontal direction. Specifically, the first predetermined direction D1 is a direction extending obliquely downward. For example, the first predetermined direction D1 is a direction in which the recording unit 21 approaches the maintenance unit 23. Further, the first predetermined direction D1 is a direction in which the recording unit 21 contacts with the maintenance unit 23. In other words, the first predetermined direction D1 is a direction in which the recording unit 21 approaches the transport belt 16.

For example, the first opposite direction D2 is a direction extending upward. Thus, when the recording unit 21 moves in the first opposite direction D2, the recording unit 21 moves upward. However, "the direction extending upward" is not limited to the vertically upward direction. Specifically, the first opposite direction D2 is a direction extending obliquely upward. For example, the first opposite direction D2 is a direction in which the recording unit 21 moves away from the maintenance unit 23. In other words, the first opposite direction D2 is a direction in which the recording unit 21 moves away from the transport belt 16.

The first driving mechanism 31A moves the recording unit 21 from the recording position P1 in the first opposite direction D2 to displace the recording unit 21 to the retraction position P3. After that, the first driving mechanism 31A moves the recording unit 21 from the retraction position P3 in the first predetermined direction D1 to displace the recording unit 21 to the maintenance position P2. The first driving mechanism 31A moves the recording unit 21 from the maintenance position P2 in the first opposite direction D2 to displace the recording unit 21 to the retraction position P3. After that, first driving mechanism 31A moves the recording unit 21 from the retraction position P3 in the first predetermined direction D1 to displace the recording unit 21 to the recording position P1. The recording position P1, the maintenance position P2, and the retraction position P3 are aligned in the first opposite direction D2 in the stated order.

Figure 5:
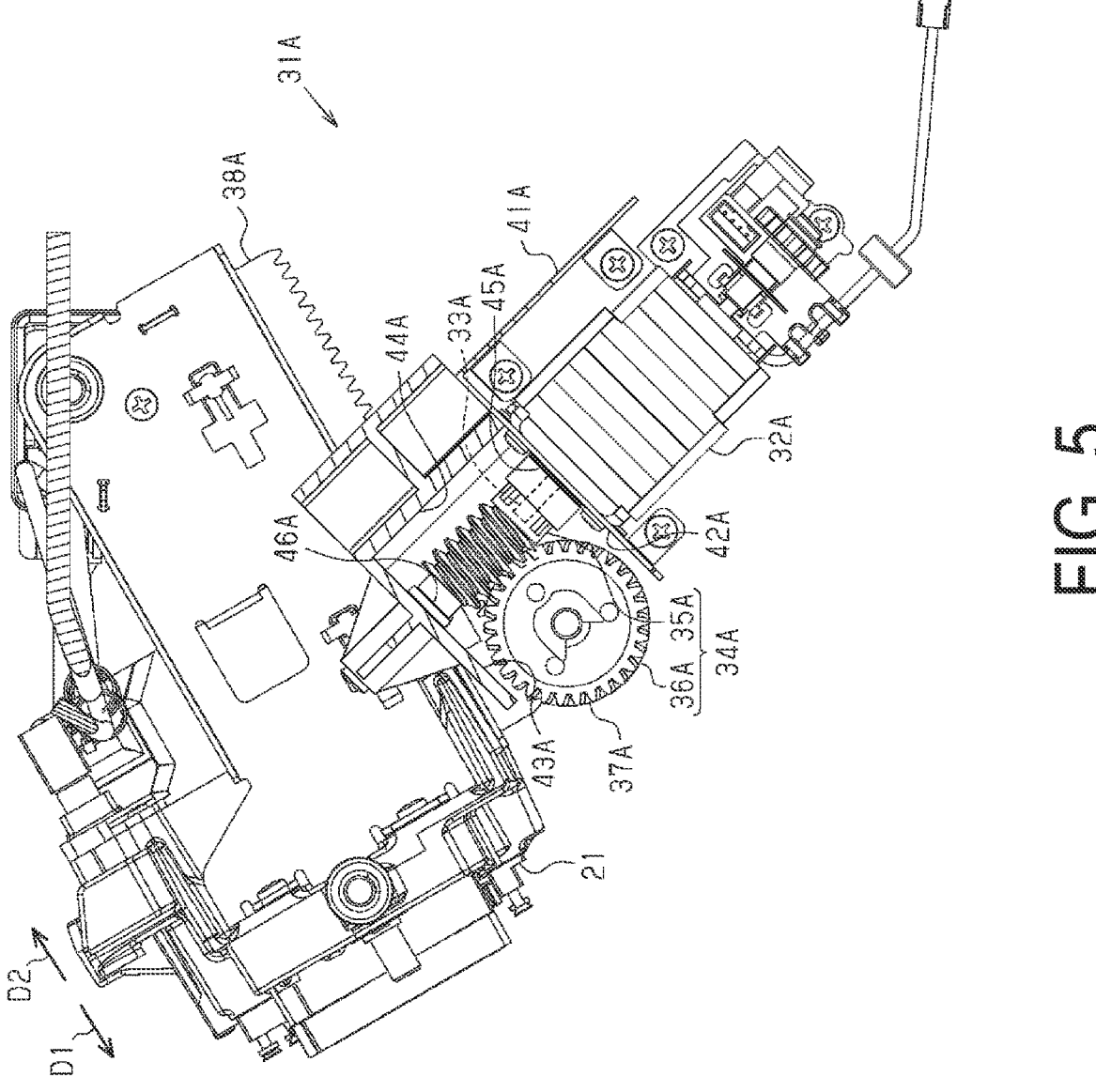
FIG. 5 is a side cross-sectional view of a first driving mechanism that moves the recording unit.

As illustrated in FIG. 5, the first driving mechanism 31A includes a first holding portion 41A. For example, the first holding portion 41A is a metal plate. The first holding portion 41A may hold the first driving source 32A. For example, the first driving source 32A may be screwed to the first holding portion 41A.

The first holding portion 41A is attached to the housing 12. In this case, the recording unit 21 moves with respect to the first holding portion 41A. The first holding portion 41A may be attached to the recording unit 21. In this case, the recording unit 21 moves together with the first holding portion 41A.

The first holding portion 41A holds the first worm Specifically, the first holding portion 41A rotatably holds the first worm 35A. The first worm 35A is held to be movable in the axial direction. The first worm 35A receives a thrust force from the first worm wheel 36A. The first worm 35A receives a thrust force to move in the axial direction. The first holding portion 41A contacts with the first worm 35A to receive the thrust force. When the first worm 35A is directly attached to the first output shaft 33A, the rotor being the first output shaft 33A moves with respect to a stator of the first driving source 32A, which is omitted in illustration.

The first holding portion 41A has a first base end part 42A and a first distal end part 43A. The first base end part 42A and the first distal end part 43A are positioned to sandwich the first worm 35A. The distance between the first base end part 42A and the first distal end part 43A is greater than the length of the first worm 35A. The first base end part 42A is a part facing the first base end of the first worm 35A. The first base end of the first worm 35A is an end of both the ends of the first worm 35A, which is closer to the first driving source 32A. The first driving source 32A is screwed to the first base end part 42A. The first distal end part 43A is a part facing the first distal end of the first worm 35A. The first distal end of the first worm 35A is an end of both the ends of the first worm 35A, which is farther from the first driving source 32A.

The first holding portion 41A has a first coupling part 44A. The first coupling part 44A is a part that couples the first base end part 42A and the first distal end part 43A to each other. For example, the first coupling part 44A extends to cover the first worm 35A. With this, the first worm 35A is protected.

When the recording unit 21 moves in the first predetermined direction D1, the first worm 35A receives a thrust force from the first worm wheel 36A. With this, the first worm approaches the first base end part 42A. As a result, the first base end part 42A receives a thrust force via a first highly-regulating portion 45A, which is described later.

When the recording unit 21 moves in the first opposite direction D2, the first worm 35A receives a thrust force from the first worm wheel 36A. With this, the first worm approaches the first distal end part 43A. As a result, the first distal end part 43A receives a thrust force via a first weakly-regulating portion 46A, which is described later.

Figure 6:
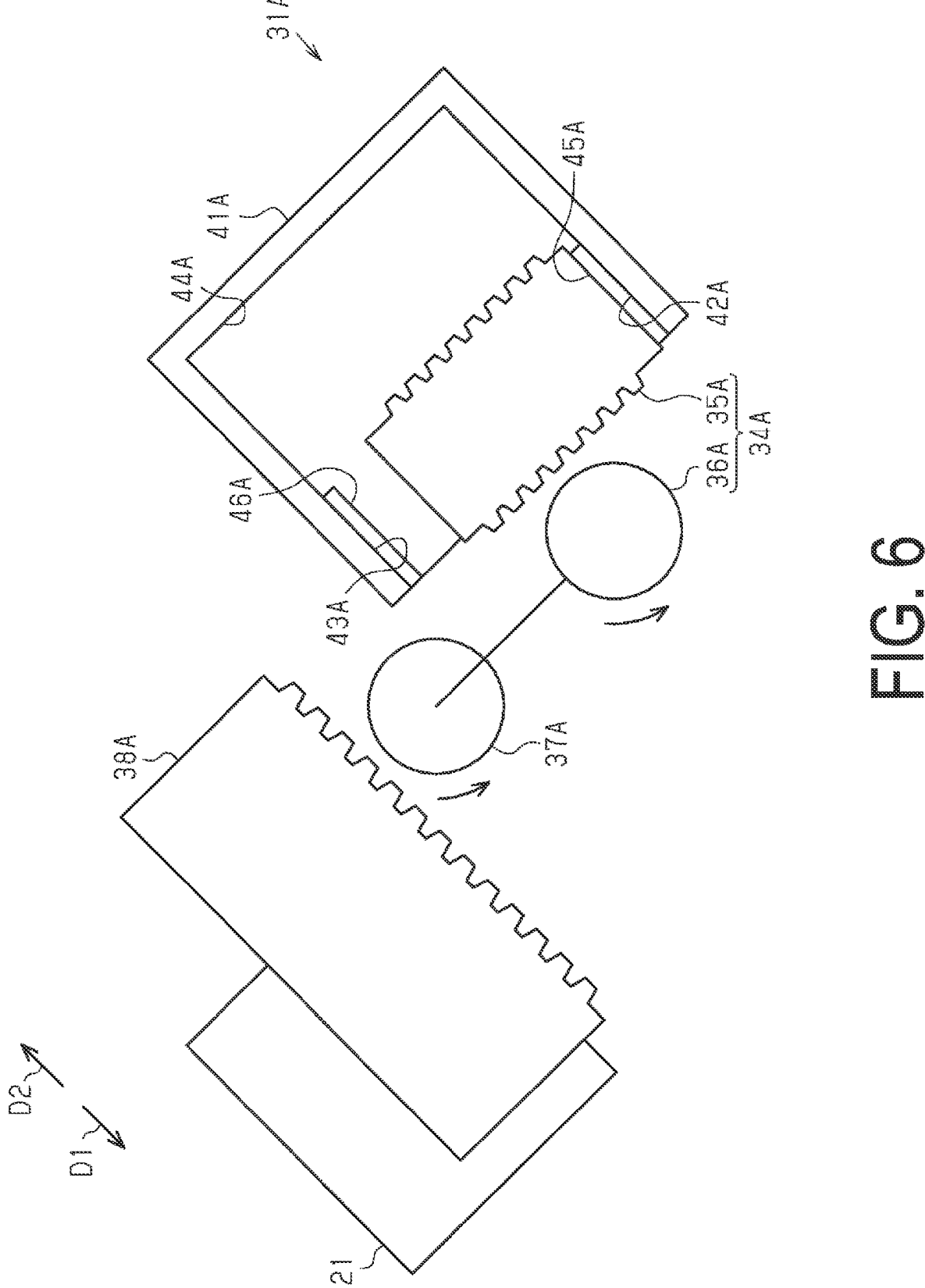
FIG. 6 is a schematic view of the first driving mechanism that moves the recording unit in a first predetermined direction.
Figure 7:
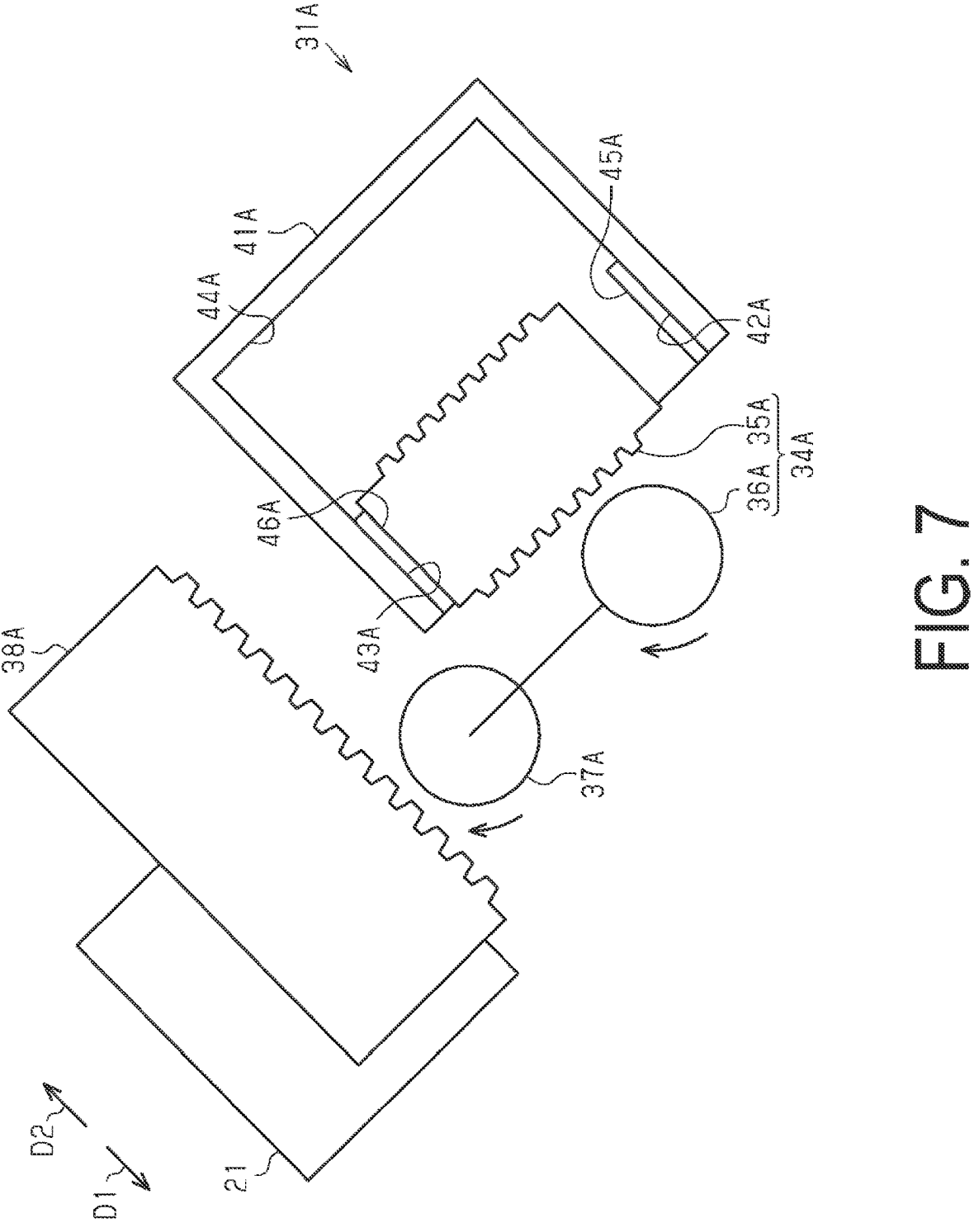
FIG. 7 is a schematic view of the first driving mechanism that moves the recording unit in a first opposite direction.

As illustrated in FIG. 6 and FIG. 7, the first holding portion 41A includes two regulation portions. The first holding portion 41A includes the first highly-regulating portion and the first weakly-regulating portion 46A. For example, the first highly-regulating portion 45A and the first weakly-regulating portion 46A are washers. The first highly-regulating portion 45A is attached to the first base end part 42A. The first weakly-regulating portion 46A is attached to the first distal end part 43A.

The length between the first highly-regulating portion 45A and the first weakly-regulating portion 46A is greater than the length of the first worm 35A. Thus, the first worm 35A moves between the first highly-regulating portion 45A and the first weakly-regulating portion 46A. When the recording unit 21 moves, the first worm 35A contacts with any one of the first highly-regulating portion 45A and the first weakly-regulating portion 46A. When the recording unit 21 moves in the first predetermined direction D1, the first highly-regulating portion 45A contacts with the first worm 35A. In this state, the first weakly-regulating portion 46A does not come into contact with the first worm 35A. When the recording unit 21 moves in the first opposite direction D2, the first weakly-regulating portion 46A contacts with the first worm 35A. In this state, the first highly-regulating portion 45A does not come into contact with the first worm 35A.

The first highly-regulating portion 45A and the first weakly-regulating portion 46A come into contact with the first worm 35A to regulate movement of the first worm 35A. A friction coefficient between the first highly-regulating portion 45A and the first worm 35A is greater than a friction coefficient between the first weakly-regulating portion 46A and the first worm 35A. Thus, when the first highly-regulating portion 45A contacts with the first worm 35A, in other words, the recording unit 21 moves in the first predetermined direction D1, the first worm 35A does not easily rotate. With this, a rotation load of the first worm 35A is increased. When the first weakly-regulating portion 46A contacts with the first worm 35A, in other words, the recording unit 21 moves in the first opposite direction D2, the first worm 35A rotates easily. With this, a rotation load of the first worm 35A is reduced. In this manner, in the first driving mechanism 31A, a rotation load of the first worm 35A, in other words, a rotation load of the first driving source 32A due to contact between the first worm 35A and the first holding portion 41A differs depending on the direction in which the recording unit 21 moves.

Second Driving Mechanism

Next, the second driving mechanism 31B is described. The second driving mechanism 31B basically includes a configuration similar to the first driving mechanism 31A.

The second driving mechanism 31B is different from the first driving mechanism 31A in the positions of the highly-regulating portion and the weakly-regulating portion.

As illustrated in FIG. 2, FIG. 3, and FIG. 4, the second driving mechanism 31B includes a second driving source 32B. The second driving source 32B is a motor. The second driving source 32B includes a second output shaft 33B. The second output shaft 33B is a so-called rotor. The second driving source 32B rotates the second output shaft 33B.

The second driving mechanism 31B may include a control circuit. The control circuit is a circuit that controls the second driving source 32B. For example, the control circuit controls the second driving source 32B, based on an instruction from the control unit 28.

The second driving mechanism 31B includes a second worm gear 34B. The second worm gear 34B is coupled to the second driving source 32B. The second worm gear 34B includes a second worm 35B and a second worm wheel 36B. The second worm 35B is coupled to the second output shaft 33B. Specifically, the second worm 35B is coupled to the second output shaft 33B via a coupling member. The second worm 35B may be coupled to the second output shaft 33B by directly attaching the second worm 35B to the second output shaft 33B. The second worm 35B rotates together with the second output shaft 33B. The second worm 35B rotates to move the moving unit, in other words, the maintenance unit 23. The second worm wheel 36B is meshed with the second worm 35B. The second worm wheel 36B rotates together with the second worm 35B.

The second driving mechanism 31B includes a second driving toothed gear 37B. The second driving toothed gear 37B is coupled to the second worm wheel 36B. For example, the second driving toothed gear 37B is positioned coaxially with the second worm wheel 36B, and then is coupled to the second worm wheel 36B. The second driving toothed gear 37B rotates together with the second worm wheel 36B. The second driving toothed gear 37B is not limited to be coaxial with the second worm wheel 36B, and may be positioned on an axis different from the second worm wheel 36B. For example, the second driving toothed gear 37B may be coupled to the second worm wheel 36B via a gear train including a plurality of toothed gears.

The second driving mechanism 31B includes a second rack 38B. The second rack 38B is meshed with the second driving toothed gear 37B. The second rack 38B linearly extends in one direction. For example, the second rack 38B extends in a second predetermined direction D3. The second rack 38B extends in a direction that is different from the first rack 38A. In other words, the second predetermined direction D3 is a direction that is different from the first predetermined direction D1 and the first opposite direction D2. The second rack 38B and the second driving toothed gear 37B form a rack-and-pinion configuration. The second driving toothed gear 37B rotates to move the second rack 38B relatively to the second driving toothed gear 37B.

For example, the second rack 38B is attached to the maintenance unit 23. Meanwhile, the second driving source 32B, the second worm gear 34B, and the second driving toothed gear 37B are attached to the housing 12. In this case, the second driving toothed gear 37B rotates to move the second rack 38B with respect to the second driving toothed gear 37B. As the second rack 38B moves, the maintenance unit 23 moves.

For example, the second rack 38B may be fixed to the housing 12. Meanwhile, the second driving source 32B, the second worm gear 34B, and the second driving toothed gear 37B may be attached to the maintenance unit 23. In this case, the second driving toothed gear 37B rotates to move the second driving source 32B, the second worm gear 34B, and the second driving toothed gear 37B with respect to the second rack 38B. As the second driving source 32B, the second worm gear 34B, and the second driving toothed gear 37B move, the maintenance unit 23 moves.

The second driving mechanism 31B moves the maintenance unit 23 in the direction in which the second rack 38B extends. The second driving mechanism 31B moves the maintenance unit 23 in the second predetermined direction D3 and a second opposite direction D4 that is opposite to the second predetermined direction D3. The second driving mechanism 31B moves the maintenance unit 23 in the second predetermined direction D3 and the second opposite direction D4 to move the maintenance unit 23 to the stand-by position Q1 and the contact position Q2.

For example, the second predetermined direction D3 is a direction extending downward. Thus, when the maintenance unit 23 moves in the second predetermined direction D3, the maintenance unit 23 moves downward. However, "the direction extending downward" is not limited to the vertically downward direction. For example, the second predetermined direction D3 is a direction that is different from both of the vertical direction and the horizontal direction. Specifically, the second predetermined direction D3 is a direction extending obliquely downward. For example, the second predetermined direction D3 is a direction in which the maintenance unit 23 moves away from the recording unit 21.

For example, the second opposite direction D4 is a direction extending upward. Thus, when the maintenance unit 23 moves in the second opposite direction D4, the maintenance unit 23 moves upward. However, "the direction extending upward" is not limited to the vertically upward direction. Specifically, the second opposite direction D4 is a direction extending obliquely upward. For example, the second opposite direction D4 is a direction in which the maintenance unit 23 approaches the recording unit 21.

The second driving mechanism 31B moves the maintenance unit 23 from the contact position Q2 in the second predetermined direction D3 to displace the maintenance unit 23 to the stand-by position Q1. The second driving mechanism 31B moves the maintenance unit 23 from the stand-by position Q1 in the second opposite direction D4 to displace the maintenance unit 23 to the contact position Q2. The stand-by position Q1 and the contact position Q2 are aligned in the second predetermined direction D3 in the stated order.

Figure 8:
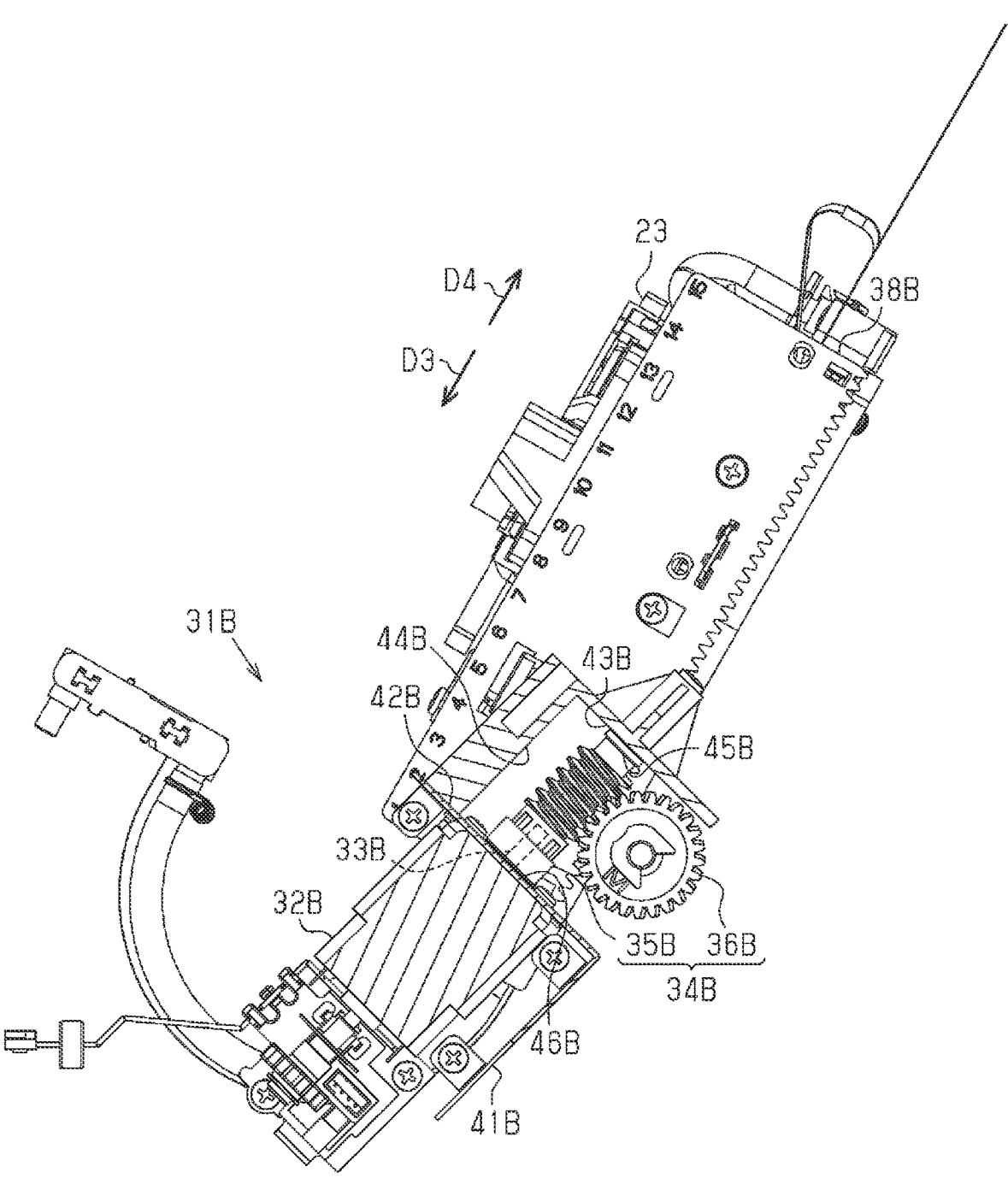
FIG. 8 is a side cross-sectional view of a second driving mechanism that moves the maintenance unit.

As illustrated in FIG. 8, the second driving mechanism 31B includes a second holding portion 41B. For example, the second holding portion 41B is a metal plate. The second holding portion 41B may hold the second driving source 32B. For example, the second driving source 32B may be screwed to the second holding portion 41B.

The second holding portion 41B is attached to the housing 12. In this case, the maintenance unit 23 moves with respect to the second holding portion 41B. The second holding portion 41B may be attached to the maintenance unit 23. In this case, the maintenance unit 23 moves with the second holding portion 41B.

The second holding portion 41B holds the second worm Specifically, the second holding portion 41B rotatably holds the second worm 35B. The second worm 35B is held to be movable in the axial direction. The second worm 35B receives a thrust force from the second worm wheel 36B. The second worm receives a thrust force to move in the axial direction. The second holding portion 41B contacts with the second worm 35B to receive the thrust force. When the second worm 35B is directly attached to the second output shaft 33B, the rotor being the second output shaft 33B moves with respect to a stator of the second driving source 32B, which is omitted in illustration.

The second holding portion 41B has a second base end part 42B and a second distal end part 43B. The second base end part 42B and the second distal end part 43B are positioned to sandwich the second worm 35B. The distance between the second base end part 42B and the second distal end part 43B is greater than the length of the second worm 35B. The second base end part 42B is a part facing the second base end of the second worm 35B. The second base end of the second worm 35B is an end of both the ends of the second worm 35B, which is closer to the second driving source 32B. The second driving source 32B is screwed to the second base end part 42B. The second distal end part 43B is a part facing the second distal end of the second worm 35B. The second distal end of the second worm 35B is an end of both the ends of the second worm 35B, which is farther from the second driving source 32B.

The second holding portion 41B has a second coupling part 44B. The second coupling part 44B is a part that couples the second base end part 42B and the second distal end part 43B to each other. For example, the second coupling part 44B extends to cover the second worm 35B. With this, the second worm 35B is protected.

When the maintenance unit 23 moves in the second predetermined direction D3, the second worm 35B receives a thrust force from the second worm wheel 36B. With this, the second worm 35B approaches the second distal end part 43B. As a result, the second distal end part 43B receives a thrust force via a second highly-regulating portion 45B, which is described later.

When the maintenance unit 23 moves in the second opposite direction D4, the second worm 35B receives a thrust force from the second worm wheel 36B. With this, the second worm 35B approaches the second base end part 42B. As a result, the second base end part 42B receives a thrust force via a second weakly-regulating portion 46B, which is described later.

Figure 9:
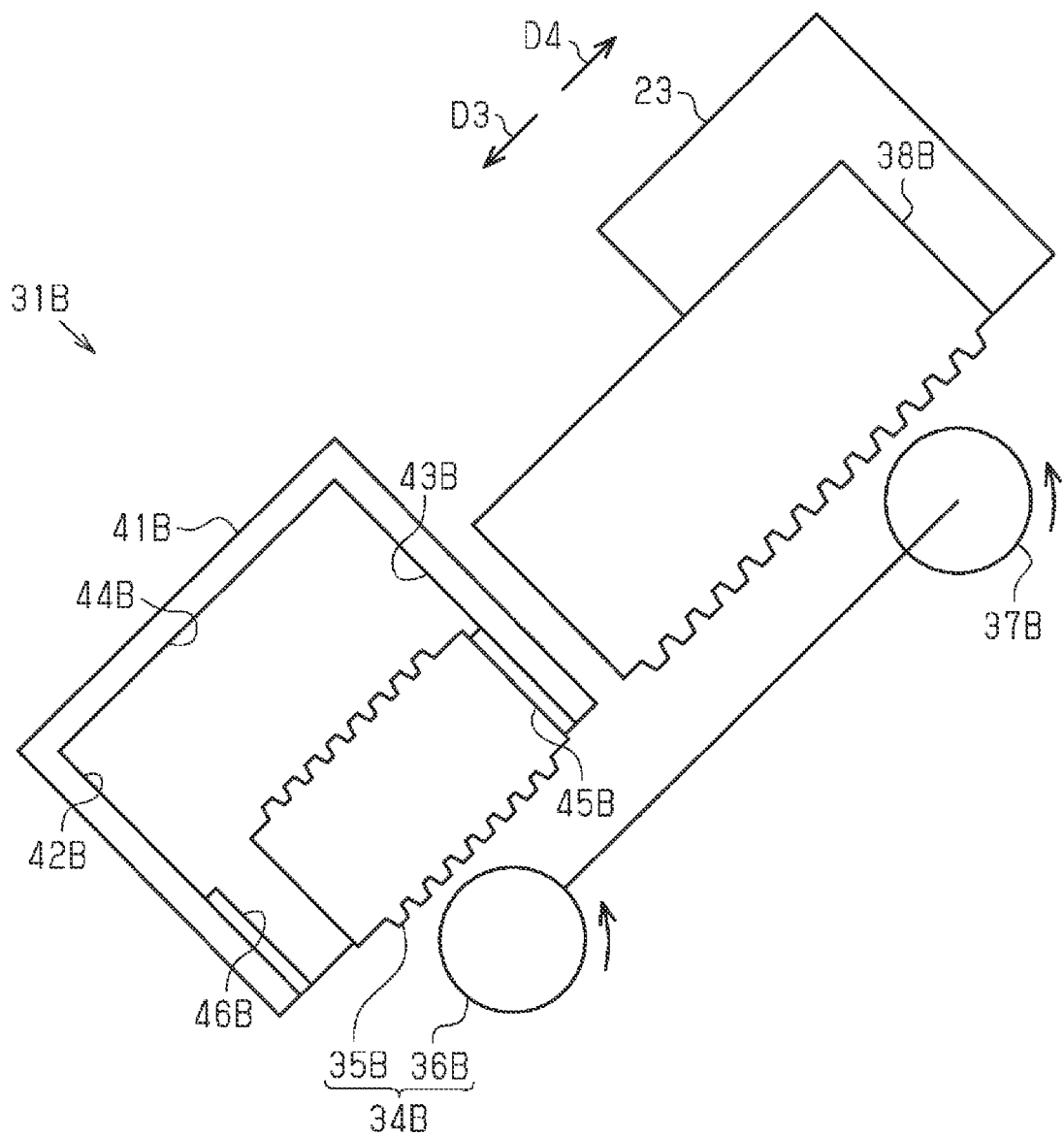
FIG. 9 is a schematic view of the second driving mechanism that moves the maintenance unit in a second predetermined direction.
Figure 10:
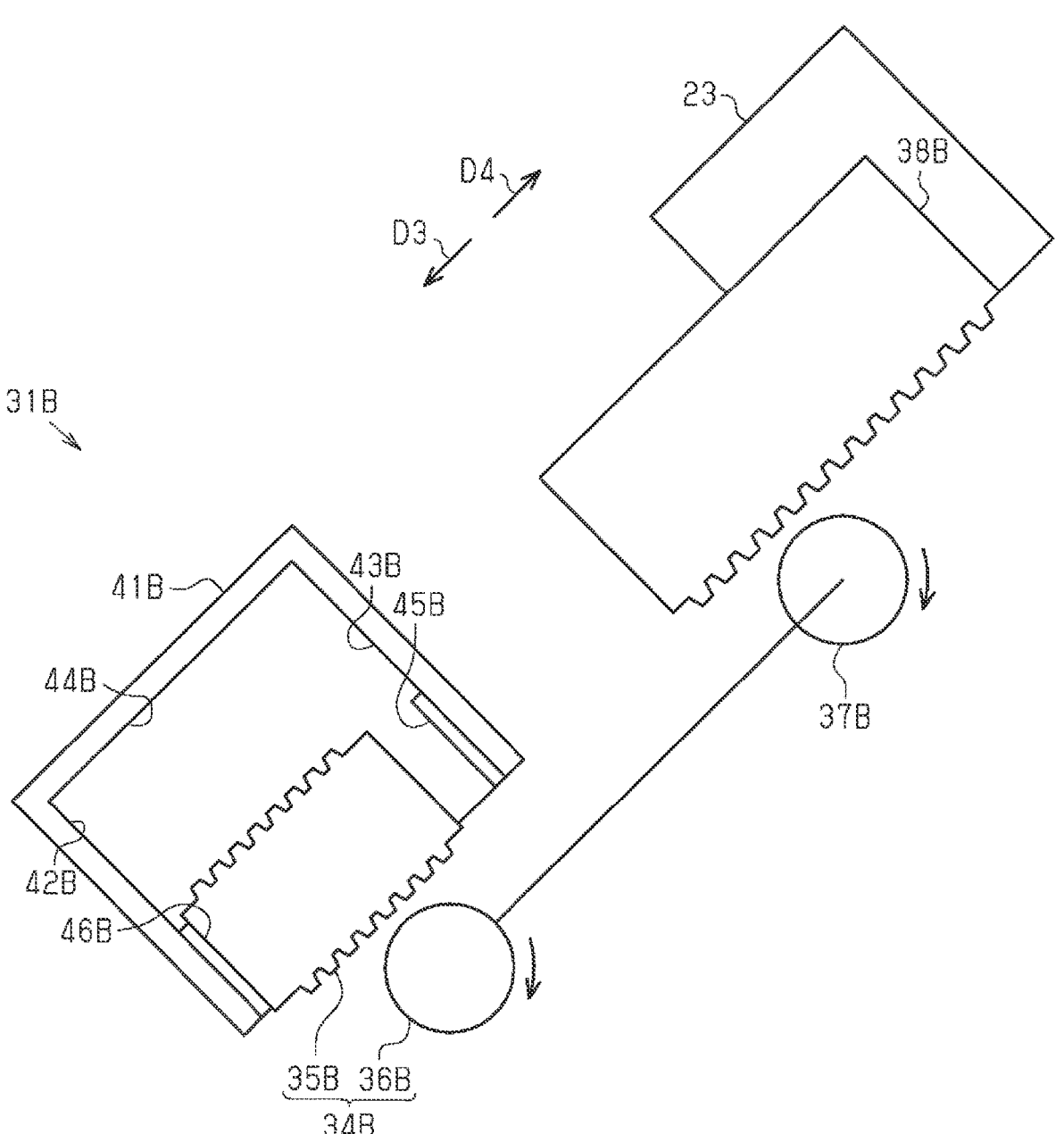
FIG. 10 is a schematic view of the second driving mechanism that moves the maintenance unit in a second opposite direction.

As illustrated in FIG. 9 and FIG. 10, the second holding portion 41B includes two regulation portions. The second holding portion 41B includes the second highly-regulating portion 45B and the second weakly-regulating portion 46B. For example, the second highly-regulating portion 45B and the second weakly-regulating portion 46B are washers. The second highly-regulating portion 45B is attached to the second distal end part 43B. The second weakly-regulating portion 46B is attached to the second base end part 42B.

The distance between the second highly-regulating portion 45B and the second weakly-regulating portion 46B is greater than the length of the second worm 35B. Thus, the second worm 35B moves between the second highly-regulating portion 45B and the second weakly-regulating portion 46B. When the maintenance unit 23 moves, the second worm 35B contacts with any one of the second highly-regulating portion 45B and the second weakly-regulating portion 46B. When the maintenance unit 23 moves in the second predetermined direction D3, the second highly-regulating portion 45B contacts with the second worm 35B. In this state, the second weakly-regulating portion 46B does not come into contact with the second worm 35B. When the maintenance unit 23 moves in the second opposite direction D4, the second weakly-regulating portion 46B contacts with the second worm 35B. In this state, the second highly-regulating portion 45B does not come into contact with the second worm 35B.

The second highly-regulating portion 45B and the second weakly-regulating portion 46B come into contact with the second worm 35B to regulate movement of the second worm 35B. A friction coefficient between the second highly-regulating portion 45B and the second worm 35B is greater than a friction coefficient between the second weakly-regulating portion 46B and the second worm 35B. Thus, when the second highly-regulating portion 45B contacts with the second worm 35B, in other words, the maintenance unit 23 moves in the second predetermined direction D3, the second worm 35B does not easily rotate. With this, a rotation load of the second worm 35B is increased. When the second weakly-regulating portion 46B contacts with the second worm 35B, in other words, the maintenance unit 23 moves in the second opposite direction D4, the second worm 35B rotates easily. With this, a rotation load of the second worm 35B is reduced. In this manner, in the second driving mechanism 31B, a rotation load of the second worm 35B, that is, a rotation load of the second driving source 32B due to contact between the second worm 35B and the second holding portion 41B differs depending on the direction in which the maintenance unit 23 moves.

Effects of First Driving Mechanism and Second Driving Mechanism

Next, effects of the first driving mechanism 31A and the second driving mechanism 31B are described. As described above, the first driving mechanism 31A and the second driving mechanism 31B are different from each other only in the targets to be moved, and include similar configurations. Thus, in the following description, when the first driving mechanism 31A and the second driving mechanism 31B are not distinguished from each other, the first driving mechanism 31A and the second driving mechanism 31B are referred to as the driving mechanism. Similarly, the first driving source 32A and the second driving source 32B are referred to as the driving source, the first output shaft 33A and the second output shaft 33B are referred to as the output shaft, the first worm gear 34A and the second worm gear 34B are referred to as the worm gear, the first worm 35A and the second worm 35B are referred to as the worm, the first worm wheel 36A and the second worm wheel 36B are referred to as the worm wheel, the first driving toothed gear 37A and the second driving toothed gear 37B are referred to as the driving toothed gear, and the first rack 38A and the second rack 38B are referred to as the rack. Further, the first holding portion 41A and the second holding portion 41B are referred to as the holding portion, the first base end part 42A and the second base end part 42B are referred to as the base end part, the first distal end part 43A and the second distal end part 43B are referred to as the distal end part, the first coupling part 44A and the second coupling part 44B are referred to as the coupling part, the first highly-regulating portion 45A and the second highly-regulating portion 45B are referred to as the highly-regulating portion, and the first weakly-regulating portion 46A and the second weakly-regulating portion 46B are referred to as the weakly-regulating portion. Further, the first predetermined direction D1 and the second predetermined direction D3 are referred to as the predetermined direction, and the first opposite direction D2 and the second opposite direction D4 are referred to as the opposite direction.

In the moving device, for example, the control unit 28 moves the moving unit downward. In this case, the moving unit easily moves due to a gravitational force, and hence a rotation load of the worm is easily reduced. In other words, acceleration of the moving unit is easily increased. As a result, there may be a risk that the moving unit moves more than expected. In view of this, in the present exemplary embodiment, when the moving unit moves downward, a rotation load of the worm is set to be increased by the highly-regulating portion. With this, when the moving unit moves downward, acceleration of the moving unit is not easily increased. Therefore, a risk that the moving unit moves more than expected can be reduced.

In the moving device, for example, the control unit 28 moves the moving unit upward. In this case, the moving unit does not easily move due to a gravitational force, a rotation load of the worm is easily increased. In other words, there may be a risk that the moving unit does not move smoothly. With regard to this point, in the driving mechanism, when the moving unit moves upward, a rotation load of the worm is set to be reduced by the weakly-regulating portion. With this, when the moving unit moves upward, the moving unit moves easily and smoothly.

In the recording device 11, when the recording unit 21 moves in the first predetermined direction D1, the first highly-regulating portion 45A reduces a risk that the recording unit 21 moves more than expected. When the recording unit 21 moves in the first opposite direction D2, the recording unit 21 can move smoothly due to the first weakly-regulating portion 46A. When the maintenance unit 23 moves in the second predetermined direction D3, the second highly-regulating portion 45B reduces a risk that the maintenance unit 23 moves more than expected. When the maintenance unit 23 moves in the second opposite direction D4, the maintenance unit 23 can move smoothly due to the second weakly-regulating portion 46B.

In a case in which the moving unit moves in the predetermined direction, at a timing at which a rotation load of the worm exceeds a threshold value, the control unit 28 may stop the driving source to stop the moving unit. In other words, the control unit 28 may execute load control to move the moving unit. Load control is control for stopping the driving source at a timing at which a rotation load of the worm exceeds the threshold value. For example, under load control, the moving unit is stopped at a timing at which the moving unit contacts with a target object at a destination. For example, a rotation load of the worm is expressed by a load current flowing through the driving source. When the moving unit that is moving contacts with the target object, a rotation load of the worm is increased. With this, the moving unit stops.

Under load control, when the moving unit contacts with the target object, a rotation load of the worm may greatly exceed the threshold value. The reason for this is because the moving unit can stop immediately. When the moving unit does not stop immediately, there may be a risk that the moving unit strongly pushes the target object. In this case, for example, there may be a risk that the moving unit plastically deforms the target object. For example, in the recording device 11, when the recording unit 21 contacts with the maintenance unit 23, the recording unit 21 strongly pushes the maintenance unit 23, which may cause a risk that the contact portion 24 and the press portion 26 are plastically deformed. Further, when the moving unit contacts with the target object, there may be a risk that the moving unit is damaged. For example, when the recording unit 21 strongly collides with the maintenance unit 23, there may be a risk that the recording unit 21 is damaged. Specifically, in the recording unit 21, a nozzle surface, which is not illustrated, on which the nozzle 22 is formed may be damaged. In view of this, in the present exemplary embodiment, when the recording unit 21 moves in the first predetermined direction D1, a rotation load of the first worm 35A is set in advance to be increased by the first highly-regulating portion 45A. With this, when the recording unit 21 contacts with the maintenance unit 23, a rotation load of the first worm 35A greatly exceeds the threshold value. Therefore, the control unit 28 can stop the recording unit 21 immediately.

In a case in which the moving unit moves in the opposite direction, at a timing at which a moving amount of the moving unit exceeds a threshold value, the control unit 28 may stop the driving source to stop the moving unit. In other words, instead of load control, the control unit 28 may execute fixed step control to move the moving unit. Fixed step control is control for stopping the driving source at a timing at which the moving amount of the moving unit exceeds the threshold value. For example, the moving amount of the moving unit is expressed by a rotation number of the driving source, a rotation speed of the driving source, or the like. For example, the moving amount of the moving unit may be measured by acquiring information relating to the rotation of the driving source by an encoder.

Under fixed step control, a rotation load of the worm may be small. This is for the purpose of improving driving efficiency of the driving source. Under fixed step control, when a rotation load of the worm is large, there may be a risk that driving efficiency of the driving source is degraded. For example, in the recording device 11, when the recording unit 21 moves in the first opposite direction D2, there may be a risk that driving efficiency of the first driving source 32A is degraded. Further, for example, when the maintenance unit 23 moves in the second opposite direction D4, there may be a risk that driving efficiency of the second driving source 32B is degraded. In view of this, in the present exemplary embodiment, when the recording unit 21 moves in the first opposite direction D2, the first a rotation load of the first worm 35A is set to be reduced by weakly-regulating portion 46A. With this, when the recording unit 21 moves from the recording position P1 or the maintenance position P2 to the retraction position P3, driving efficiency of the first driving source 32A is improved. Further, when the maintenance unit 23 moves in the second opposite direction D4, a rotation load of the second worm 35B is set to be reduced by the second weakly-regulating portion 46B. With this, when the maintenance unit 23 moves from the stand-by position Q1 to the contact position Q2, driving efficiency of the second driving source 32B is improved.

In the present exemplary embodiment, when the recording unit 21 moves in the first predetermined direction D1, the control unit 28 executes load control. When the recording unit 21 moves in the first opposite direction D2, the control unit 28 executes fixed step control. When the maintenance unit 23 moves both in the second predetermined direction D3 and the second opposite direction D4, the control unit 28 executes fixed step control. In the driving mechanism, load control and fixed step control can freely be selected according to a target object to be moved, a moving direction, or the like.

Effect

Next, effects of the exemplary embodiment described above are described.

(1) In the driving mechanism, a friction coefficient between the highly-regulating portion and the worm is greater than a friction coefficient between the weakly-regulating portion and the worm. According to the configuration described above, when the moving unit moves in the predetermined direction, a rotation load of the worm is relatively increased. When the moving unit moves in the opposite direction, a rotation load of the worm is relatively reduced. In this manner, a rotation load of the worm can be changed by the highly-regulating portion and the weakly-regulating portion according to a direction in which the moving unit moves.

(2) In the driving mechanism, the moving unit that moves in the predetermined direction moves downward.

When the moving unit moves in the predetermined direction, acceleration of the moving unit is easily increased due to an effect of a gravitational force. According to the configuration described above, a rotation load of the worm is relatively increased by the highly-regulating portion, and hence a risk that acceleration of the moving unit is increased is reduced.

(3) In the moving device, when the moving unit moves in the predetermined direction, at a timing at which a rotation load of the worm exceeds the threshold value, the control unit 28 stops the driving source to stop the moving unit.

Under load control, in order to stop the moving unit immediately, a rotation load of the worm may greatly exceed the threshold value when a load is generated at the moving unit. According to the configuration described above, a rotation load of the worm is set in advance to be increased by the highly-regulating portion, and hence the moving unit can easily be stopped immediately based on a rotation load of the worm.

(4) In the moving device, in a case in which the moving unit moves in the opposite direction, at a timing at which the moving amount of the moving unit exceeds the threshold value, the control unit 28 stops the driving source to stop the moving unit.

Under fixed step control, in order to improve driving efficiency of the driving source, a rotation load of the worm may be small. According to the configuration described above, a rotation load of the worm is set to be reduced by the weakly-regulating portion, and hence driving efficiency of the driving source is improved.

(5) In the recording device 11, the first predetermined direction D1 is a direction in which the recording unit 21 approaches the maintenance unit 23. The first opposite direction D2 is a direction in which the recording unit 21 moves away from the maintenance unit 23.

When the recording unit 21 approaches the maintenance unit 23, it is not ideal that the recording unit 21 is too close to the maintenance unit 23 in some cases. Further, when the recording unit 21 contacts with the maintenance unit 23, it is not ideal that the recording unit 21 strongly contacts with the maintenance unit 23. According to the configuration described above, when the recording unit 21 approaches the maintenance unit 23, a rotation load of the first worm 35A is relatively increased by the first highly-regulating portion 45A. Thus, a risk that the recording unit 21 is too close to the maintenance unit 23 or contacts with the maintenance unit 23 strongly can be reduced.

(6) The recording device 11 includes the first driving mechanism 31A that moves the recording unit 21 in the first predetermined direction D1 and the first opposite direction D2 and the second driving mechanism 31B that moves the maintenance unit 23 in the second predetermined direction D3 and the second opposite direction D4.

According to the configuration described above, when the recording unit 21 moves in the first predetermined direction D1, a rotation load of the first worm 35A is relatively increased. When the recording unit 21 moves in the first opposite direction D2, a rotation load of the first worm 35A is relatively reduced. When the maintenance unit 23 moves in the second predetermined direction D3, a rotation load of the second worm 35B is relatively increased. When the maintenance unit 23 moves in the second opposite direction D4, a rotation load of the second worm 35B is relatively reduced. In this manner, a rotation load of the first worm 35A and a rotation load of the second worm 35B can be changed by the highly-regulating portion and the weakly-regulating portion according to directions in which the recording unit 21 and the maintenance unit 23 move.

(7) In the recording device 11, the first predetermined direction D1 and the second predetermined direction D3 are directions that are different from the vertical direction and the horizontal direction. The first predetermined direction D1 is a direction in which the recording unit 21 contacts with the maintenance unit 23. The first opposite direction D2 is a direction in which the recording unit 21 moves away from the maintenance unit 23. The second predetermined direction D3 is a direction in which the maintenance unit 23 moves away from the recording unit 21. The second opposite direction D4 is a direction in which the maintenance unit 23 approaches the recording unit 21. The recording unit 21 moving in the first predetermined direction D1 moves downward. The maintenance unit 23 moving in the second predetermined direction D3 moves downward.

With the configuration described above, when the recording unit 21 moves in the first predetermined direction D1, acceleration of the recording unit 21 is easily increased. When the recording unit 21 moves in the first opposite direction D2, which is against a gravitational force, the recording unit 21 does not easily move. When the maintenance unit 23 moves in the second predetermined direction D3, acceleration of the maintenance unit 23 is easily increased. When the maintenance unit 23 moves in the second opposite direction D4, which is against a gravitational force, the maintenance unit 23 does not easily move. With regard to this point, a rotation load of the first worm 35A is relatively increased by the first highly-regulating portion 45A, and hence a risk that acceleration of the recording unit 21 is increased is reduced. A rotation load of the first worm 35A is relatively reduced by the first weakly-regulating portion 46A, the recording unit 21 easily moves. A rotation load of the second worm 35B is relatively increased by the second highly-regulating portion 45B, and hence a risk that acceleration of the maintenance unit 23 is increased is reduced. A rotation load of the second worm 35B is relatively reduced by the second weakly-regulating portion 46B, and hence the maintenance unit 23 easily moves.

Modification Examples

The exemplary embodiment described above can be modified and implemented as follows. The exemplary embodiment described above and the following modification examples can be combined and implemented within a technically consistent range.

The recording device 11 is only required to include at least one of the first driving mechanism 31A and the second driving mechanism 31B. For example, the recording device 11 may include only the first driving mechanism 31A. For example, the recording device 11 may include only the second driving mechanism 31B.

The recording device 11 may include the control unit 28 for each driving mechanism. For example, the recording device 11 may include a first control unit that controls the first driving mechanism 31A and a second control unit that controls the second driving mechanism 31B.

The control unit 28 may execute load control both in a case in which the moving unit moves in the predetermined direction and a case in which the moving unit moves in the opposite direction. A braking force with respect to the moving unit can be changed by the highly-regulating portion and the weakly-regulating portion according to a direction in which the moving unit moves.

In the exemplary embodiment described above, the highly-regulating portion and the weakly-regulating portion are compared with each other based on a dynamic friction coefficient, and may be compared with each other based on a static friction coefficient. In general, a static friction coefficient is greater than a dynamic friction coefficient. When the moving unit moves in the predetermined direction while the worm contacts with the weakly-regulating portion, a static frictional force acts between the worm and the weakly-regulating portion. When the moving unit moves in the predetermined direction so that the worm contacts with the highly-regulating portion, a dynamic frictional force acts between the worm and the highly-regulating portion. When the moving unit moves in the opposite direction while the worm contacts with the highly-regulating portion, a static frictional force acts between the worm and the highly-regulating portion. When the moving unit moves in the opposite direction so that the worm contacts with the weakly-regulating portion, a dynamic frictional force acts between the worm and the weakly-regulating portion. Thus, when a static frictional force acts on the worm by the highly-regulating portion and the weakly-regulating portion, the threshold value for the rotation load may be set to such a degree that the worm is rotatable.

The predetermined direction may match with the vertical direction. The predetermined direction may match with the horizontal direction. The liquid ejected from the recording unit 21 is not limited to ink, and may be, for example, a liquid material including particles of a functional material dispersed or mixed in a liquid. For example, the recording unit 21 may discharge a liquid material including a material such as an electrode material or a pixel material used in manufacture of a liquid crystal display, an electroluminescent (EL) display, and a surface emitting display in a dispersed or dissolved form.

Technical Concepts

Hereinafter, description is made on technical concepts and effects thereof that are understood from the exemplary embodiment and the modified examples described above.

(A) A driving mechanism is configured to move a moving unit in a predetermined direction and an opposite direction that is opposite to the predetermined direction, the driving mechanism including a worm configured to be coupled to a driving source and to rotate to move the moving unit, a worm wheel configured to mesh with the worm, and a holding portion configured to hold the worm, wherein the holding portion includes a highly-regulating portion configured to come into contact with the worm when the moving unit moves in the predetermined direction, and a weakly-regulating portion configured to come into contact with the worm when the moving unit moves in the opposite direction, and a friction coefficient between the highly-regulating portion and the worm is greater than a friction coefficient between the weakly-regulating portion and the worm.

According to the configuration described above, when the moving unit moves in the predetermined direction, a rotation load of the worm is relatively increased. When the moving unit moves in the opposite direction, a rotation load of the worm is relatively reduced. In this manner, a rotation load of the worm can be changed by the highly-regulating portion and the weakly-regulating portion according to a direction in which the moving unit moves. For example, when the moving unit moves downward, acceleration of the moving unit is easily increased due to a gravitational force. Thus, a rotation load of the worm may be increased. For example, when the moving unit moves upward, which is against a gravitational force, a rotation load of the worm may be small.

(B) In the above-mentioned driving mechanism, in a case in which the moving unit moves in the predetermined direction, at a timing at which a rotation load of the worm exceeds a threshold value, the driving source may stop to stop the moving unit.

Stoppage of the moving unit according to a rotation load of the worm is referred to as load control. Under load control, in order to stop the moving unit immediately, a rotation load of the worm may greatly exceed the threshold value when a load is generated at the moving unit. According to the configuration described above, a rotation load of the worm is set in advance to be increased by the highly-regulating portion, and hence the moving unit can easily be stopped immediately based on a rotation load of the worm.

(C) In the above-mentioned driving mechanism, in a case in which the moving unit moves in the opposite direction, at a timing at which a moving amount of the moving unit exceeds a threshold value, the driving source may stop to stop the moving unit.

Stoppage of the moving unit according to the moving amount of the moving unit is referred to as fixed step control. Under fixed step control, in order to improve driving efficiency of the driving source, a rotation load of the worm may be small. According to the configuration described above, a rotation load of the worm is set to be reduced by the weakly-regulating portion, and hence driving efficiency of the driving source is improved.

(D) In the above-mentioned driving mechanism, the moving unit that moves in the predetermined direction may move downward.

When the moving unit moves in the predetermined direction, acceleration of the moving unit is easily increased due to an effect of a gravitational force. According to the configuration described above, a rotation load of the worm is relatively increased by the highly-regulating portion, and hence a risk that acceleration of the moving unit is increased is reduced.

(E) A moving device includes the above-mentioned driving mechanism, the moving unit, and a control unit configured to control the driving mechanism, wherein, in a case in which the moving unit is moved in the predetermined direction, at a timing at which a rotation load of the worm exceeds the threshold value, the control unit stops the driving source to stop the moving unit. According to the configuration described above, effects similar to those in the above-mentioned driving mechanism can be exerted.

(F) A moving device may include the above-mentioned driving mechanism, the moving unit, and a control unit configured to control the driving mechanism, wherein, in a case in which the moving unit is moved in the opposite direction, at a timing at which a moving amount of the moving unit exceeds the threshold value, the control unit may stop the driving source to stop the moving unit. According to the configuration described above, effects similar to those in the above-mentioned driving mechanism can be exerted.

(G) A recording device includes the above-mentioned driving mechanism and the moving unit, wherein the moving unit is a recording unit configured to perform recording on a medium.

According to the configuration described above, in the recording device in which the driving mechanism moves the recording unit, effects similar to those in the above-mentioned driving mechanism can be exerted.

(H) The above-mentioned recording device may include a maintenance unit configured to perform maintenance for the recording unit, wherein the recording unit may be configured to eject a liquid onto a medium to perform recording on the medium, the predetermined direction may be a direction in which the recording unit approaches the maintenance unit, and the opposite direction may be a direction in which the recording unit moves away from the maintenance unit.

When the recording unit approaches the maintenance unit, it is not ideal that the recording unit is too close to the maintenance unit in some cases. Further, when the recording unit contacts with the maintenance unit, it is not ideal that the recording unit strongly contacts with the maintenance unit. According to the configuration described above, when the recording unit approaches the maintenance unit, a rotation load of the worm is relatively increased by the highly-regulating portion. Thus, a risk that the recording unit is too close to the maintenance unit or contacts with the maintenance unit strongly can be reduced.

(I) The above-mentioned recording device may further include a control unit configured to control the driving mechanism and the recording unit.

According to the configuration described above, effects similar to those in the above-mentioned driving mechanism can be exerted.

(J) A recording device includes the above-mentioned driving mechanism, a recording unit configured to eject a liquid onto a medium to perform recording, and the moving unit, wherein the moving unit is a maintenance unit configured to perform maintenance for the recording unit. According to the configuration described above, in the recording device in which the driving mechanism moves the maintenance unit, effects similar to those in the above-mentioned driving mechanism can be exerted.

(K) The above-mentioned recording device may further include a control unit configured to control the driving mechanism and the recording unit.

According to the configuration described above, effects similar to those in the above-mentioned driving mechanism can be exerted.

(L) A recording device includes a recording unit configured to eject a liquid onto a medium to perform recording, a maintenance unit configured to perform maintenance for the recording unit, a first driving mechanism configured to move the recording unit in a first predetermined direction and a first opposite direction that is opposite to the first predetermined direction, and a second driving mechanism configured to move the maintenance unit in a second predetermined direction and a second opposite direction that is opposite to the second predetermined direction, wherein the second predetermined direction is a direction that is different from the first predetermined direction and the first opposite direction, the first driving mechanism includes a first worm configured to be coupled to a first driving source and to rotate to move the recording unit, a first worm wheel configured to mesh with the first worm, and a first holding portion configured to hold the first worm, the first holding portion includes a first highly-regulating portion configured to come into contact with the first worm when the recording unit moves in the first predetermined direction, and a first weakly-regulating portion configured to come into contact with the first worm when the recording unit moves in the first opposite direction, the second driving mechanism includes a second worm configured to be coupled to a second driving source and to rotate to move the maintenance unit, a second worm wheel configured to mesh with the second worm, and a second holding portion configured to hold the second worm, the second holding portion includes a second highly-regulating portion configured to come into contact with the second worm when the maintenance unit moves in the second predetermined direction, and a second weakly-regulating portion configured to come into contact with the second worm when the maintenance unit moves in the second opposite direction, a friction coefficient between the first highly-regulating portion and the first worm is greater than a friction coefficient between the first weakly-regulating portion and the first worm, and a friction coefficient between the second highly-regulating portion and the second worm is greater than a friction coefficient between the second weakly-regulating portion and the second worm.

According to the configuration described above, when the recording unit moves in the first predetermined direction, a rotation load of the first worm is relatively increased. When the recording unit moves in the first opposite direction, a rotation load of the first worm is relatively reduced. When the maintenance unit moves in the second predetermined direction, a rotation load of the second worm is relatively increased. When the maintenance unit moves in the second opposite direction, a rotation load of the second worm is relatively reduced. In this manner, a rotation load of the first worm and a rotation load of the second worm can be changed by the highly-regulating portion and the weakly-regulating portion according to directions in which the recording unit and the maintenance unit move.

(M) In the above-mentioned recording device, the first predetermined direction and the second predetermined direction may be directions that are different from a vertical direction and a horizontal direction, the first predetermined direction may be a direction in which the recording unit approaches the maintenance unit, the first opposite direction may be a direction in which the recording unit moves away from the maintenance unit, the second predetermined direction may be a direction in which the maintenance unit moves away from the recording unit, the second opposite direction may be a direction in which the maintenance unit approaches the recording unit, the recording unit that moves in the first predetermined direction may move downward, and the maintenance unit that moves in the second predetermined direction may move downward.

With the configuration described above, when the recording unit moves in the first predetermined direction, acceleration of the recording unit is easily increased. When the recording unit moves in the first opposite direction, which is against a gravitational force, the recording unit does not easily move. When maintenance unit moves in the second predetermined direction, acceleration of the maintenance unit is easily increased. When the maintenance unit moves in the second opposite direction, which is against a gravitational force, the maintenance unit does not easily move. With regard to this point, a rotation load of the first worm is relatively increased by the first highly-regulating portion, and hence a risk that acceleration of the recording unit is increased is reduced. A rotation load of the first worm is relatively reduced by the first weakly-regulating portion, the recording unit easily moves. A rotation load of the second worm is relatively increased by the second highly-regulating portion, and hence a risk that acceleration of the maintenance unit is increased is reduced. A rotation load of the second worm is relatively reduced by the second weakly-regulating portion, and hence the maintenance unit easily moves.

What is claimed is:

1. A driving mechanism configured to move a moving unit in a predetermined direction and an opposite direction that is opposite to the predetermined direction, the driving mechanism comprising:

a worm configured to be coupled to a driving source and to rotate to move the moving unit;

a worm wheel configured to mesh with the worm; and a holding portion configured to hold the worm, wherein the holding portion includes:

a first regulating portion configured to come into contact with the worm when the moving unit moves in the predetermined direction; and a second regulating portion configured to come into contact with the worm when the moving unit moves in the opposite direction, and a friction coefficient between the first regulating portion and the worm is greater than a friction coefficient between the second regulating portion and the worm.

2. The driving mechanism according to claim 1, wherein when the moving unit moves in the predetermined direction, at a timing at which a rotation load of the worm exceeds a threshold value, the driving source stops to stop the moving unit.

3. A moving device, comprising:

a driving mechanism of claim 2;

the moving unit; and a control unit configured to control the driving mechanism, wherein when the moving unit is moved in the predetermined direction, at a timing at which a rotation load of the worm exceeds the threshold value, the control unit stops the driving source to stop the moving unit.

4. The driving mechanism according to claim 1, wherein when the moving unit moves in the opposite direction, at a timing at which a moving amount of the moving unit exceeds a threshold value, the driving source stops to stop the moving unit.

5. A moving device, comprising:

a driving mechanism of claim 4;

the moving unit; and a control unit configured to control the driving mechanism, wherein when the moving unit is moved in the opposite direction, at a timing at which a moving amount of the moving unit exceeds the threshold value, the control unit stops the driving source to stop the moving unit.

6. The driving mechanism according to claim 1, wherein the moving unit that moves in the predetermined direction moves downward.

7. A recording device, comprising:
a driving mechanism of claim 1; and
the moving unit, wherein
the moving unit is a recording unit configured to perform recording on a medium.

8. The recording device according to claim 7, comprising
a maintenance unit configured to perform maintenance for the recording unit, wherein
the recording unit is configured to eject a liquid onto a medium to perform the recording on the medium,
the predetermined direction is a direction in which the recording unit approaches the maintenance unit, and
the opposite direction is a direction in which the recording unit moves away from the maintenance unit.

9. The recording device according to claim 7, further comprising
a control unit configured to control the driving mechanism and the recording unit.

10. A recording device, comprising:
a driving mechanism of claim 1;
a recording unit configured to eject a liquid onto a medium to perform recording; and
the moving unit, wherein
the moving unit is a maintenance unit configured to perform maintenance for the recording unit.

11. The recording device according to claim 10, further comprising
a control unit configured to control the driving mechanism and the recording unit.

12. A recording device, comprising:
a recording unit configured to eject a liquid onto a medium to perform recording;
a maintenance unit configured to perform maintenance for the recording unit;
a first driving mechanism configured to move the recording unit in a first predetermined direction and a first opposite direction that is opposite to the first predetermined direction; and
a second driving mechanism configured to move the maintenance unit in a second predetermined direction and a second opposite direction that is opposite to the second predetermined direction, wherein
the second predetermined direction is a direction that is different from the first predetermined direction and the first opposite direction,
the first driving mechanism includes:

a first worm coupled to a first driving source and configured to rotate to move the recording unit;
a first worm wheel configured to mesh with the first worm; and
a first holding portion configured to hold the first worm,
the first holding portion includes:
a first regulating portion configured to come into contact with the first worm when the recording unit moves in the first predetermined direction; and
a second regulating portion configured to come into contact with the first worm when the recording unit moves in the first opposite direction,
the second driving mechanism includes:
a second worm coupled to a second driving source and configured to rotate to move the maintenance unit;
a second worm wheel configured to mesh with the second worm; and
a second holding portion configured to hold the second worm,
the second holding portion includes:
a third regulating portion configured to come into contact with the second worm when the maintenance unit moves in the second predetermined direction; and
a fourth regulating portion configured to come into contact with the second worm when the maintenance unit moves in the second opposite direction,
a friction coefficient between the first regulating portion and the first worm is greater than a friction coefficient between the second regulating portion and the first worm, and
a friction coefficient between the third regulating portion and the second worm is greater than a friction coefficient between the fourth regulating portion and the second worm.

13. The recording device according to claim 12, wherein
the first predetermined direction and the second predetermined direction are directions that are different from a vertical direction and a horizontal direction,
the first predetermined direction is a direction in which the recording unit approaches the maintenance unit,
the first opposite direction is a direction in which the recording unit moves away from the maintenance unit,
the second predetermined direction is a direction in which the maintenance unit moves away from the recording unit,
the second opposite direction is a direction in which the maintenance unit approaches the recording unit,
the recording unit that moves in the first predetermined direction moves downward, and
the maintenance unit that moves in the second predetermined direction moves downward.

* * * * *